United States Patent
Helms et al.

[15] 3,691,523
[45] Sept. 12, 1972

[54] VEHICLE WHEEL TEMPERATURE MONITORING SYSTEM

[72] Inventors: Millard O. Helms, R.F.D. 2; Oris G. Dunbar, 817 Reservoir, both of Hannibal, Mo. 63401

[22] Filed: June 3, 1971

[21] Appl. No.: 149,728

[52] U.S. Cl. ..................340/57, 340/228, 340/233
[51] Int. Cl. ...........................G08b 21/00, B60q 1/00
[58] Field of Search ..........340/52, 52 B, 57, 58, 227, 340/231, 228, 233

[56] References Cited
UNITED STATES PATENTS 3,237,156   2/1966   Irvine ..........................340/57
3,614,731   10/1971   Hluchan ......................340/57

Primary Examiner—Alvin H. Waring
Attorney—Dawson, Tilton, Fallon & Lungmus

[57] ABSTRACT

A temperature-compensated system for monitoring excessive heat build-up at any wheel of a vehicle includes first and second temperature sensitive elements mounted on either side of each wheel backing plate. The pairs of sensors are connected in circuit with each other and with the vehicle's battery to generate an alarm in the vehicle cab when excessive heat is sensed at any wheel, irrespective of the cause of the excessive heat. A light indicates in which wheel the trouble occurred.

6 Claims, 6 Drawing Figures

PATENTED SEP 12 1972　　3,691,523

INVENTORS
MILLARD O. HELMS
ORIS G. DUNBAR

BY Dawson Tilton
Fallon & Lungmus
ATT'YS.

INVENTORS
MILLARD O. HELMS
ORIS G. DUNBAR

BY Dawson Tilton
Fallon & Lungmus
ATT'YS.

VEHICLE WHEEL TEMPERATURE MONITORING SYSTEM

BACKGROUND OF THE INVENTION

1. Field of the Invention

The present invention relates to a safety device for wheeled vehicles; and more particularly, it is directed to a system for sensing excessive heat build-up at any wheel of a vehicle.

2. Known Systems

A low tire or flat tire or other malfunction at the wheel of a vehicle sometimes may go unnoticed by the operator, particularly when he has no physical sensation of the malfunction, as in the case of a dual-wheel or tandem or trailing type vehicle. The early detection of the wheel malfunction greatly enhances safety, not only the safety of the operator and vehicle, but to other persons on the road, particularly at high speeds and in congested traffic situations.

Various systems and devices have been proposed for detecting and signaling excessive temperature at a wheel of a moving vehicle. Some such systems have not, however, met with general commercial acceptance for one reason or another. In some prior systems, the reason for lack of use is that the system could be installed only by the original manufacturer, who has been, up to now, reluctant to increase prices by incorporating such safety systems. This is particularly true for prior systems which included a sensor that rotated with the wheel. Such devices were installed on the hub or other rotating part. Other systems have been found undesirable because they require the use of a special power source or additional batteries with voltages as high as 30 volts. Thus, the installation and maintenance of such systems is cumbersome.

Still other systems are in service only intermittently—that is, the bearing temperatures are periodically sampled. Usually, these systems do not isolate the fault. That is, some prior systems merely indicate that an excessive temperature has been sensed, and the operator, at that time, has no more exact indication of where the fault is located.

Other disadvantages in prior systems include a lack of temperature compensation so that the system is triggered at the highest temperature that is considered safe for operation. Since the ambient temperature range for vehicle operation is quite large, depending upon weather conditions, it is undesirable to signal a fault depending only upon absolute temperature.

SUMMARY OF THE INVENTION

The system of the present invention includes first and second temperature sensitive elements mounted respectively on either side of the backing plate for each wheel. The pairs of sensors are connected in a balanced bridge circuit with each other, and the bridge circuit is energized by the vehicle's battery. The sensor mounted outside of the wheel backing plate compensates for changes in ambient temperature.

When extensive temperature is sensed within the brake drum, either because of a low or flat tire, malfunction in the brake system, overheating of a bearing, etc., the bridge becomes unbalanced, and the signal is generated at a console in the vehicle cab visible to the operator. Since all wheels are monitored simultaneously, there is preferably a separate visual indicator for each wheel. An audio alarm may also be sounded to attract the driver's attention. A quick glance at the console will indicate which wheel is malfunctioning.

The system is very simply installed be drilling two holes in the backing plate for each wheel. A central stud mounts both temperature sensitive elements to the vehicle backing plate, and the other hole is used to route a wire engaging the sensor inside the brake drum. Wires from each of the sensors are then routed to a console inside the vehicle cab. The wheel backing plate is preferably used to ground the other terminal of each sensor and thereby eliminate the need for a third wire at each wheel.

Thus, the present invention is easy to install, either before or after purchase of the vehicle. Further, the system operates off of the vehicle's own battery, and it does not draw appreciable current from the battery until a fault is detected.

The system is temperature compensated for variations in ambient temperature, and there is no critical operating temperature range. The sensing system involves no moving parts on the wheel of a vehicle. The system is in operation continuously, no intermittently; and it provides for a separate signal for each wheel to isolate a detected fault.

Other features and advantages of the present invention will be apparent to persons skilled in the art from the following detailed description of a preferred embodiment accompanied by the attached drawing wherein identical reference numerals will refer to like parts in the various views.

THE DRAWING

DETAILED DESCRIPTION

Figure 1:
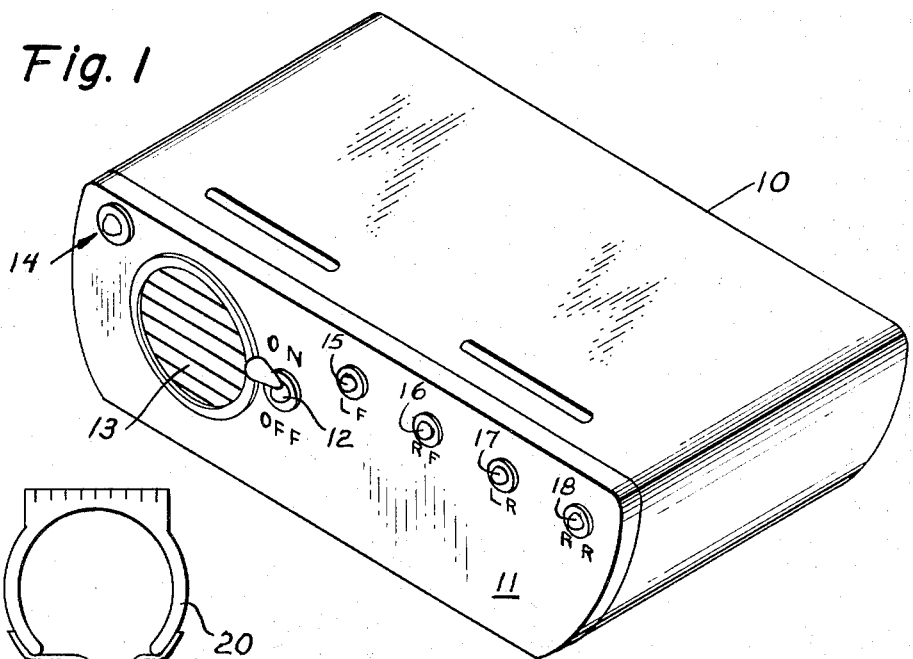
FIG. 1 is a perspective view of a console used with the inventive system.

Turning first to FIG. 1, there is shown a console including a cabinet generally designated by reference numeral 10 and adapted to be mounted beneath the dashboard in the cab of a truck, for example, or in any other automotive vehicle. The cabinet 10 includes a faceplate 11 on which there are mounted an on/off toggle switch 12, a speaker 13, a pilot light 14, and four indicator lights designated 15—18, each signaling the condition at a different wheel. If more than four wheels are present on the vehicle, obviously, more indicator lights may be added. For convenience, it will be assumed that the indicator lights 15—18 are indicative respectively of the left front wheel, right front wheel, left rear wheel, and right rear wheel.

At each wheel of the vehicle, there are located two temperature-sensitive elements, sometimes referred to as sensors. These elements are preferably thermistors in the form of a disc with a set central aperture. A thermistor is an electrical circuit element which has a pronounced temperature-versus-resistance characteristic.

Figure 2:
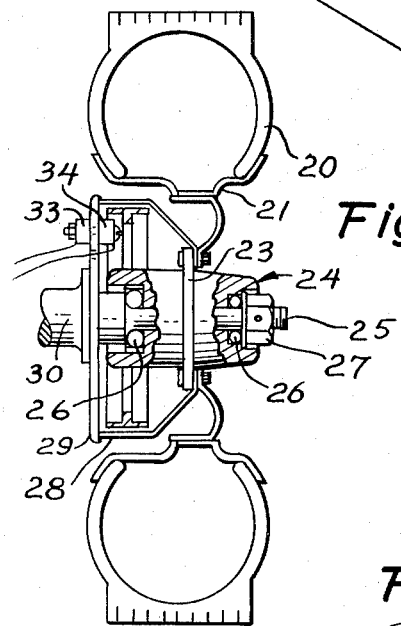
FIG. 2 is a vertical cross-sectional view of a vehicle wheel illustrating mounting of the sensors.
Figure 3:
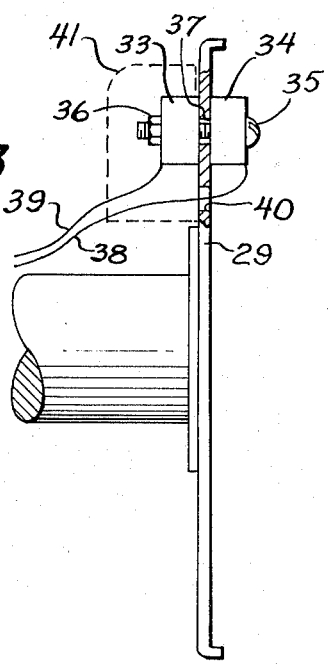
FIG. 3 is a close-up view showing the mounting of the sensors.
Figure 4:
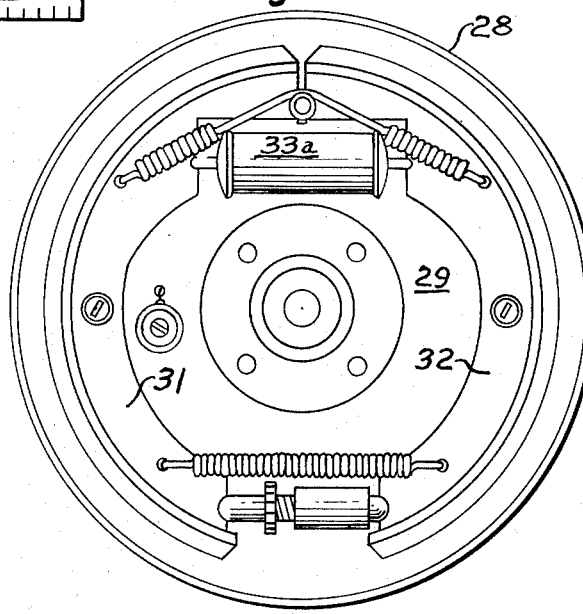
FIG. 4 is a side view of the wheel of FIG. 2.

Turning now to FIGS. 2–4, the mounting of a pair of thermistors at one wheel will be described before an explanation is given of the electrical portion of the system. In FIG. 2, a tire 20 is mounted on a wheel 21 which is secured to a peripheral flange 23 of a hub 24. The hub 24 is rotatably mounted to a shaft 25 by means of bearings 26, and a threaded nut 27 holds the hub onto the shaft 25. A brake drum 28 is also attached to the peripheral flange 23, and adjacent the left-hand portion of the drum 28 is a wheel backing plate 29 which is rigidly mounted to an axle 30.

Turning to FIG. 4, first and second brake shoes 31 and 32 are conventionally mounted to the wheel backing plate 29, and they are adapted to expand and engage the innersurface of the drum 28 when a wheel cylinder 33 is actuated.

First and second thermistors, of the type described, are designated respectively 33 and 34, and they are mounted respectively to the outside and inside surfaces of the wheel backing plate 29. That is, the thermistor 33 is outside of the brake drum, whereas the thermistor 34 is mounted inside the brake drum. The brake drum, of course, rotates relative to the backing plate 29.

Turning now to FIG. 3, the thermistors 33, 34 may be mounted by means of a screw 35 and nut 36 which are made of nylon or other insulating material. The paint adjacent the thermistors on either side of the backing plate 29 may be scraped away so that the opposing surfaces of the thermistors are grounded against the backing plate 29. A first hole 37 is drilled in the backing plate 29 to receive the bolt 35. Conductive wires 38 and 39 are connected respectively to the isolated terminals of the thermistors 35, 36. A second aperture 40 is formed in the backing plate 29 to permit passage of the wire 38.

Alternatively, if it is desired, isolating washers may separate the thermistors from the backing plate 29, and the mounting bolt 35 and nut 36 may be conductive so as to connect the outer terminals of each thermistor in common. This common terminal may then be grounded to the backing plate 29, and the wires 38, 39 connected respectively to the ungrounded terminals of the thermistors 34, 33. In either case, it is desirable to ground a common terminal of both resistors to the backing plate 29 so as to avoid the need for a third wire at each wheel location.

It is also desirable, from the viewpoint of protecting the outside thermistor 33, to mount the thermistors at a location behind the axle. As an alternative, a housing may be mounted to cover the thermistor 33, as diagrammatically illustrated by the dashed line 41. The housing 41 may be held in place by an extension of the bolt 35 and a second nut (not shown) holding the housing 41 against the backing plate 29.

Figure 5:
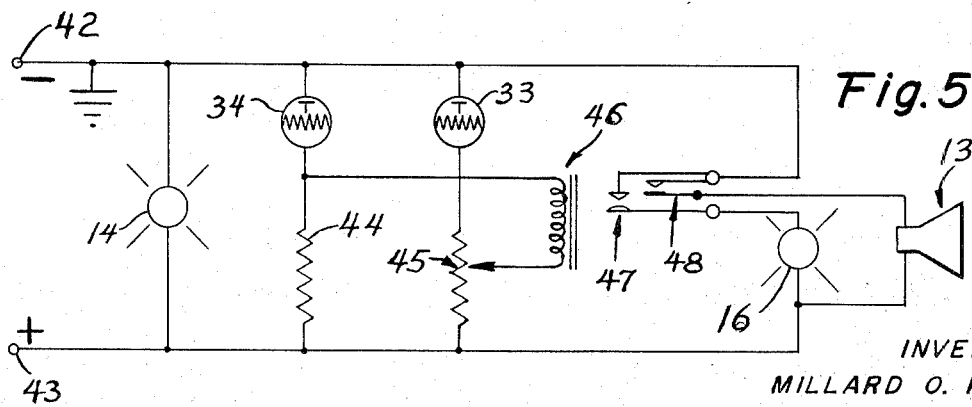
FIG. 5 is a circuit schematic diagram for a single wheel.

Turning now to FIG. 5, the circuit operation for one individual wheel will be described. The thermistors 33 and 34 are shown in electrical schematic form, and the common terminals of these thermistors are connected to the negative terminal of the battery 42 via ground. The positive terminal of the battery is designated 43. A first fixed resistor 44 is connected between the ungrounded terminal of thermistor 34 and the positive battery terminal 43. A potentiometer 45 is connected between the ungrounded terminal of thermistor 33 and the positive battery terminal 43. A coil 46 of a relay is connected between the wiper arm of the potentiometer 45 and the junction between thermistor 34 and fixed resistor 44. Two pairs of normally open contacts generally designated respectively by reference numerals 47 and 48 are actuated by the relay 46. The normally open contacts 47 are connected in series with the filament of a lamp such as the lamp 17 shown in FIG. 1, and this series circuit is connected between the terminal 42, 43. The normally open contacts 48 are connected in series with the coil of speaker 13 between the terminals 42, 43. The previously described indicator light 14 has its filaments connected across the terminals 42, 43, although it will be described later, the on/off switch 12 is preferably connected in series with the battery so that when the on/off switch 12 is open, the indicator lamp 14 is not energized.

In operation, the thermistors 33, 34 and the resistors 44, 45 form a bridge circuit which is energized by the battery. The bridge is balanced by adjusting the variable resistor 45 so that no current flows through the relay coil 46 when the vehicle is not in use. For variations in ambient temperature, the resistance of the thermistors 33, 34 will vary correspondingly so that the bridge always remains in balance. When a fault occurs in the wheel, so as to build excessive heat within the brake drum 28, the thermistor 34 will experience a substantial rise in temperature, hence, its resistance will increase dramatically and current will flow through the coil 46, thereby energizing the relay to close the contacts 47 and 48. When the relay contacts are closed, the audio alarm or buzzer 13 will attract the attention of the operator, and lighting of the lamp 16 will signal to him that the right front tire is malfunctioning.

Figure 6:
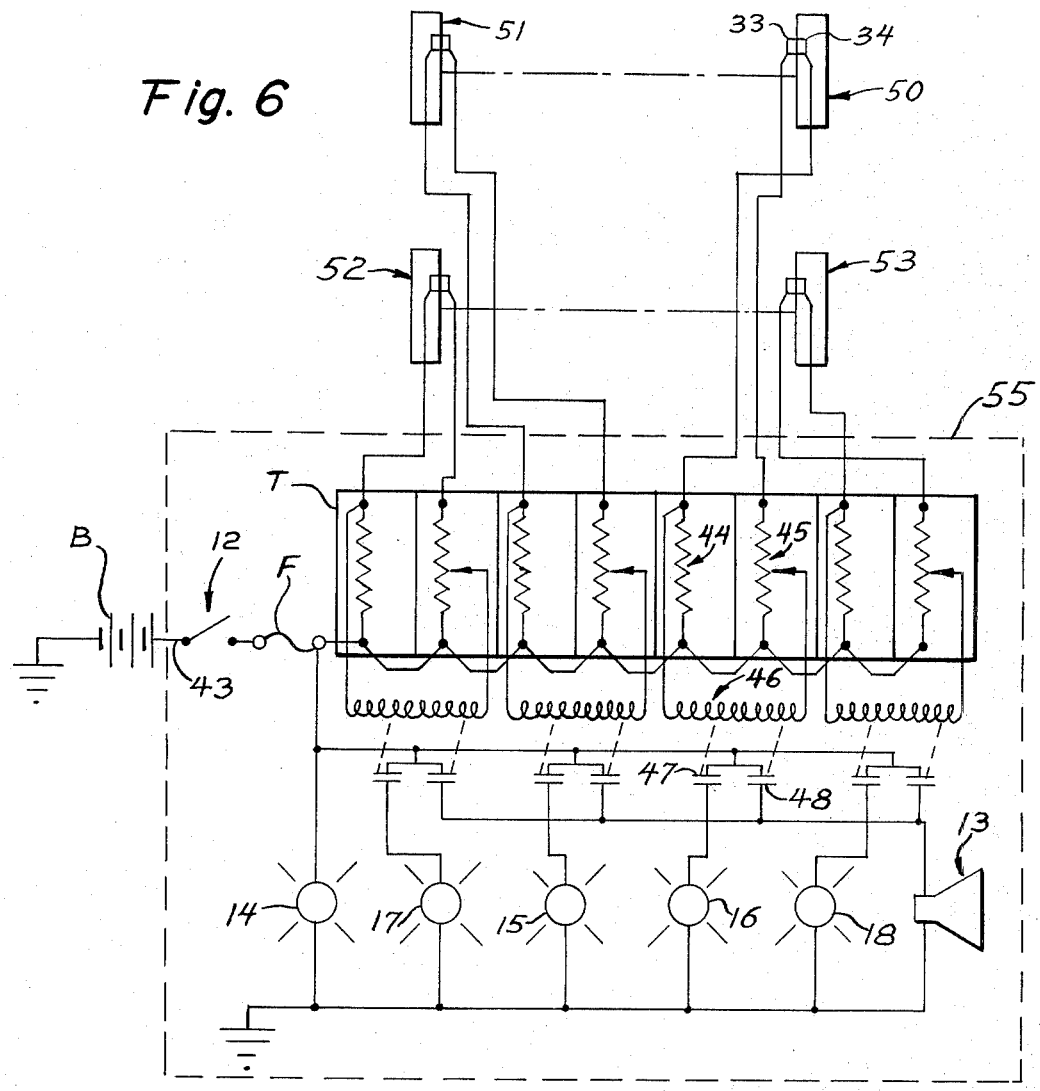
FIG. 6 is a circuit schematic diagram incorporating the present invention for all four wheels of a vehicle.

Referring now to FIG. 6, the total system is seen in electrical schematic form with the four wheels of the vehicle shown in diagrammatic form. The right front wheel is denoted 50, the left front wheel 51, the left rear wheel 52, and the right rear wheel 53.

The components mounted within the cabinet 10 or attached to the faceplate 11 are enclosed within the dashed line 55, and the automobile battery is designated B. Further, the on/off switch 12 and a fuse F may be connected in series with the positive terminal 43 of the battery B.

The circuitry associated with the right front wheel 50 has already been described in detail, and identical circuitry is associated with each of the other wheels 51—53, so that additional description need not be given for that circuitry in order to completely understand the invention. The fixed and variable resistors may be mounted on a terminal block T, as illustrated.

The operation of the circuitry for each of the wheels 51—53 is similar to that which has already been described, but will be summarized here. That is, associated with each wheel is a pair of thermistors, one mounted on either side of the wheel backing plate. The thermistors are connected in a balanced bridge, the center arm of which contains a relay coil. When the thermistor within the brake drum becomes overheated, it causes the bridge to be unbalanced, and the relay is energized. One set of normally open contacts actuated by the relay couples power from the battery B to the filament of an associated indicator lamp. A second set of normally open contacts actuated by the relay couples power from the battery B through the switch 12 and fuse to the audible alarm 13.

It will be observed from the overall system diagram of FIG. 6 that if any of the wires connected to the thermistors breaks or becomes disconnected, the system will still be operative for the other wheels. Further, the monitoring of the individual wheels is continuous, and a fault is brought immediately to the attention of the operator by means of the audible alarm. A quick glance at the indicator lamps will then isolate which of the wheels has experienced the malfunction.

Another principal advantage of the present invention, is the fact that installation is easily accomplished, merely requiring two holes drilled in the wheel backing plate, one for mounting the thermistors on a common bolt and the other for feeding a wire to the thermistor connected inside the brake drum. Mounting may be accomplished by the vehicle manufacturer, or the system may be sold as a separate entity after the vehicle has been purchased.

There are no parts of the system which revolve with the wheels, yet any fault or malfunction which occurs at a wheel will be detected, such as a defective wheel bearing or lack of lubrication in the wheel bearing or any brake malfunction which would cause the shoe to drag on the drum and thereby produce a temperature rise.

Having thus described in detail a preferred embodiment of the inventive system, persons skilled in the art will be able to modify certain of the structure which has been illustrated and to substitute equivalent elements for those which have been disclosed while continuing to practice the principle of the invention; and it is, therefore, intended, that all such modifications and substitutions be covered as they are embraced within the spirit and scope of the appended claims.

We claim

1. A monitoring system for a vehicle having a plurality of wheels, each wheel including a backing plate, comprising: first and second temperature sensitive elements mounted on either side of each backing plate; a vehicle battery; circuit means connecting each pair of temperature sensitive elements in a balanced bridge circuit energized by said battery; switching means associated with each of said bridge circuits energized when its associated bridge circuit is unbalanced; audible alarm means energized when any of said switching means is energized; and an indicator lamp associated with each wheel and energized only when the switching circuit associated with that wheel is energized.

2. The system of claim 1 wherein said temperature sensitive elements are disc-shaped thermistors and further comprising means for mounting said thermistors respectively to the outside of said associated backing plate and to the inside thereof within the brake drum, said mounting means comprising insulating connector means and means for conductively coupling one terminal of each of said thermistors to ground.

3. The system of claim 1 further comprising a console adapted to be mounted beneath the dashboard of said vehicle and housing said audible alarm means and said indicator lamps.

4. The system of claim 3 further comprising an on/off switch connected in series with said battery and adapted to selectively couple power to said circuitry.

5. The system of claim 4 further comprising a pilot light having its filament connected in circuit with said on/off switch to indicate when said system is operative.

6. In a system for monitoring the temperature of a wheel of a vehicle having a rigid backing plate partially defining the brake drum area for said vehicle, the combination of first and second temperature sensitive elements; means for mounting said elements respectively to the inside and to the outside of said vehicle backing plate wherein one terminal of each element is in conductive relation with said vehicle backing plate to provide a common ground; and a conductive wire for each of said elements, said vehicle backing plate further defining an aperture for receiving the wire of said element mounted to the inside of said backing plate; and balanced bridge circuit means including said temperature sensitive elements for generating a signal when one of said elements senses a temperature rise relative to the other of said elements.

* * * * *